Sept. 1, 1931. H. A. ROHRICH 1,821,077
GLASSWARE FORMING MACHINE
Filed April 6, 1929
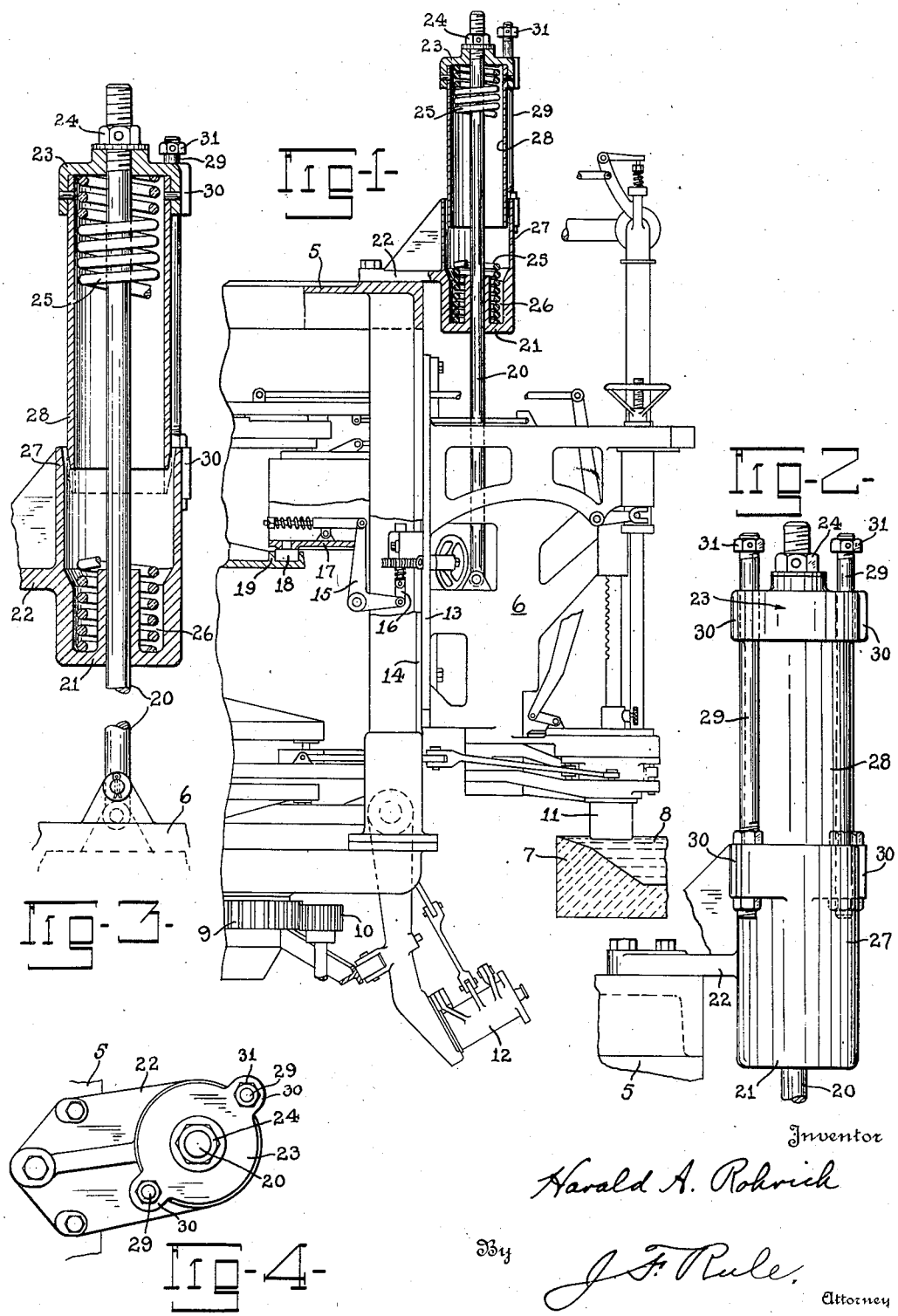
Inventor
Harald A. Rohrich
By J. F. Rule,
Attorney Patented Sept. 1, 1931

1,821,077

UNITED STATES PATENT OFFICE

HAROLD A. ROHRICH, OF TOLEDO, OHIO, ASSIGNOR TO OWENS-ILLINOIS GLASS COMPANY, OF TOLEDO, OHIO, A CORPORATION OF OHIO

GLASSWARE FORMING MACHINE

Application filed April 6, 1929. Serial No. 352,975.

The present invention relates to improvements in glassware forming machines and more particularly to machines in which the blank molds gather mold charges by suction from a supply body of molten glass over which the molds move in succession.

In machines of the above character the construction ordinarily includes a rotary mold carriage supporting an annular series of dipping frames or heads each carrying at its lower end a suction blank mold. These frames are brought in succession to a position over a supply body of molten glass by rotation of the mold carriage, and are lowered one at a time to contact with the glass, and charges of glass are drawn by suction into the mold cavities. The dipping frames with the molds thereon are then lifted away from the glass and a cutoff knife moved laterally across the bottom of the molds to thereby sever the gathered quantities of glass from the supply body and close the lower ends of the mold cavities. At predetermined stations following the gathering of glass in the above manner the blank molds open and the glass is transferred to a finishing mold wherein expansion of the glass to its final shape is effected.

During the charge gathering operation it is highly desirable to insure movement of the molds in a true horizontal plane so that unbroken contact between the glass and mold is maintained thruout the period of time required to completely fill the mold cavities with molten glass. Excessive vibration of the dipping frames and blank molds thereon frequently results in premature breaking of contact between the molds and glass so that quantities of air are drawn into the mold cavities with the glass. Glassware produced under such conditions is generally defective in that it does not contain a sufficient amount of glass and distribution of the glass in the articles is uneven. Also, vibration of the dipping frames is detrimental to the charge severing operation in that it permits relative vertical movement between the blank molds and cutoff knives.

An object of the present invention is to avoid the above objections by providing means to eliminate or at least minimize vibration of the dipping frames and blank molds thereon to thereby insure continuous contact between the glass and mold during the charge gathering operations.

Another object is to provide spring devices individual to the dipping frames operating to prevent excessive vertical movement of the molds during gathering of mold charges.

Other objects will be apparent hereinafter.

In the drawings:

Fig. 1 is a sectional elevation showing the counterbalancing device on one head of a glassware forming machine.

Fig. 2 is a detail front elevation of the device.

Fig. 3 is a detail sectional view thereof.

Fig. 4 is a plan view.

In the drawings the machine with which the invention is associated comprises a rotary mold carriage 5 supporting an annular series of dipping frames 6 which are brought in succession to a position over the container 7 for a supply body of molten glass 8 from which mold charges are gathered. Each dipping frame 6 carries at its lower end a partible blank mold 11 into which mold charges are drawn by suction and then transformed into blanks or parisons preparatory to expansion in the finishing molds 12 to the shape of the articles of glassware being produced. Rotary motion is imparted to the mold carriage 5 thru a ring gear 9 and pinion 10, the latter being driven by a motor or the like (not shown).

The dipping frames 6 are adapted to be reciprocated vertically on the mold carriage 5 while over the supply body of molten glass 8. Downward movement of the frames causes charge gathering contact between the blank molds 11 and the glass. Upward movement of the frames following contact between the mold and glass so positions that molds that cutoff knives (not shown) carried by the mold carriage 5, may be moved laterally across the lower ends of the blank molds to sever the mold charges from the supply body of glass.

This upward movement also raises the molds to a plane in which they may clear the rim of the container 7. In providing for such movement of the blank molds and supporting frames therefor, each dipping frame 6 is connected to the mold carriage 5 by means of a vertical slide 13 on the frame fitted in slideways 14 on the mold carriage. A bell crank lever 15 is fulcrumed on the mold carriage and connected at one end thru a link 16 to the frame 6. The other end of the lever 15 has yielding connection to a slide 17. This slide 17 carries a cam roll 18 which runs in a continuous stationary cam 19, so shaped that it rocks the bell crank lever 15 and thereby moves the dipping frame 6 downward sufficiently to effect charge gathering contact between the blank mold 11 and the supply body of glass 8. Such downward movement of the frame 6 is opposed by a counterbalancing device which forms a part of the connection between each dipping frame and the mold carriage.

This counterbalancing device in the illustrated embodiment thereof, comprises a connector rod 20 secured at its lower end to the dipping frame 6 and extending upwardly thru a guide 21 on an attaching bracket 22 bolted or otherwise connected to the upper end of the mold carriage 5. The connector rod 20 extends a considerable distance above the guide 21 and carries a cap plate 23 which is held against upward movement on the rod by an adjusting nut 24. A coil spring 25 encircles the connector rod 20 between the guide 21 and cap plate 23, the lower end of the spring being seated in an annular channel 26 formed in the upper side of the guide 21. Tubular extensions 27 and 28 on the guide 21 and cap plate 23 respectively form a housing which encloses the coil spring 25. These tubular extensions telescope one within the other as shown in Fig. 1. A pair of vertical guide rods 29 connect the upper and lower sections of the spring housing, said sections being formed with apertured bosses 30 thru which the rods 29 extend. The lower ends of the rods 29 (Fig. 2) are rigidly secured to the bosses 30 on the lower section of the spring housing while the upper ends of said rods are slidingly fitted in the openings in the upper bosses 30. Adjustable stops in the form of nuts 31 threaded on the upper ends of the rod 29 above the bosses 30 limit relative movement of the telescoping tubular extensions in one direction.

By adjusting the position of the nut 24 at the upper end of the connector rod 20 the tension of the spring 25 may be varied. Thus the effectiveness of the spring 25 as a counterbalancing device for the corresponding dipping frame and the extent to which it opposes downward movement of the frame may be regulated.

Modifications may be resorted to within the spirit and scope of the appended claims.

What I claim is:

1. In a glassware forming machine, the combination of a mold carriage, a dipping frame mounted for vertical sliding movement on said carriage, means to move said dipping frame downward relative to the mold carriage at regular time intervals, a guide member mounted at the upper end of the mold carriage, a connector rod carried by the dipping frame and extending upwardly thru said guide member, a coil spring encircling the rod above the guide member, and means for confining said spring between the guide member and the upper end of the rod.

2. In a glassware forming machine, the combination of a mold carriage, a dipping frame mounted for vertical sliding movement on said carriage, means to move said dipping frame downward relative to the mold carriage at regular time intervals, a guide member mounted at the upper end of the mold carriage, a connector rod carried by the dipping frame and extending upwardly thru said guide member, a tubular member enclosing the upper portion of the rod, and a coil spring encircling the rod and enclosed in said tubular member.

3. In a glassware forming machine, the combination of a mold carriage, a dipping frame mounted for vertical sliding movement on said carriage, means to move said dipping frame downward relative to the mold carriage at regular time intervals, a guide member mounted at the upper end of the mold carriage, a connector rod carried by the dipping frame and extending upwardly thru said guide member, a tubular member enclosing the upper portion of the rod, a coil spring encircling the rod and enclosed in said tubular member, and means to vary the position of the tubular member on the rod to thereby adjust the tension of the spring.

4. In a glassware forming machine the combination of a mold carriage, a dipping frame mounted on said carriage for up and down movement, means to move said dipping frame, a guide member mounted at the upper end of the mold carriage, a connector carried by the frame and extending upwardly through said guide member, a coil spring arranged on the upper side of the guide member, and means whereby movement of the dipping frame in one direction compresses said spring.

Signed at Toledo, Ohio, this 4th day of April, 1929.

HAROLD A. ROHRICH.